United States Patent [19]

Corrigan

[11] 4,309,576
[45] Jan. 5, 1982

[54] LISTENING DEVICE FOR LOCALIZING UNDERGROUND WATER LEAKAGES

[75] Inventor: James E. Corrigan, Plymouth, Mass.

[73] Assignee: Heath Consultants Incorporated, Stoughton, Mass.

[21] Appl. No.: 58,002

[22] Filed: Jul. 16, 1979

[51] Int. Cl.³ .................... G01M 3/16; H01L 41/10; H04R 1/02; H04R 17/00
[52] U.S. Cl. ................... 179/110 A; 73/592; 73/DIG. 4; 179/184; 181/125; 310/340; 340/605; 367/180
[58] Field of Search ............. 179/1 ST, 138, 110 A, 179/184; 73/40.5 A, 592, DIG. 4; 310/336, 340, 344, 369, 334; 367/180, 188; 181/125; 340/605

[56] References Cited

U.S. PATENT DOCUMENTS

| | | | |
|---|---|---|---|
| 2,220,281 | 11/1940 | Riggs | 179/110 A X |
| 2,447,333 | 8/1948 | Hayes | 179/110 A |
| 2,755,336 | 7/1956 | Zener et al. | 179/1 ST |
| 3,289,465 | 12/1966 | Parker | 73/40.5 A |
| 3,458,656 | 7/1969 | Sewerin | 179/1 ST |
| 3,470,394 | 9/1969 | Cook et al. | 310/334 |
| 3,500,676 | 3/1970 | Palmer | 73/40.5 A |
| 3,548,121 | 12/1970 | Gorike | 179/184 |
| 3,775,816 | 12/1973 | Gordon et al. | 310/334 X |
| 3,867,839 | 2/1975 | Herzl | 73/194 B |
| 3,921,016 | 11/1975 | Livermore et al. | 179/110 A X |
| 4,012,604 | 3/1977 | Speidel | 179/121 C |

*Primary Examiner*—Thomas W. Brown
*Attorney, Agent, or Firm*—Robert G. Mentag

[57] ABSTRACT

A listening device for pinpointing water leakages, which includes a manually operated rod having a handle at one end for manually positioning of the listening device. An acoustic pick-up apparatus is mounted on the other end of the rod, and it comprises a ceramic audio tone transducer which is operatively connected to an amplifier-receiver which has a level meter on which visual leak signals may be seen. The acoustic pick-up apparatus is also connected to a head phone set to allow hearing of the leaks. The transducer includes a brass diaphragm directly attached to a threaded stud for mounting in the rod.

3 Claims, 5 Drawing Figures

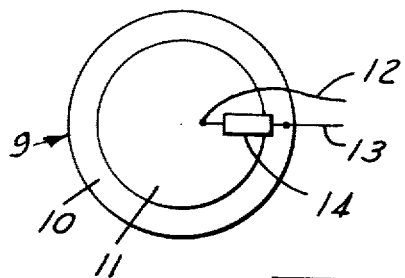
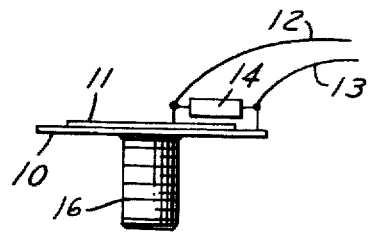
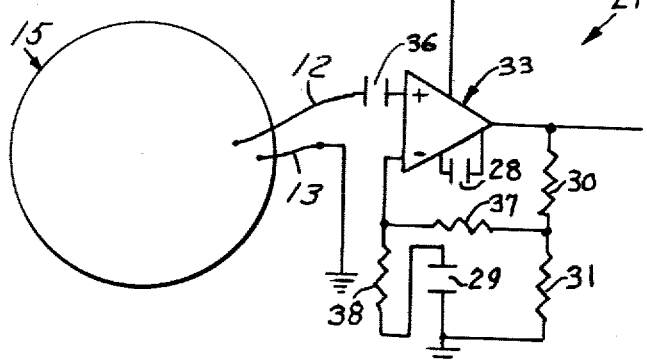
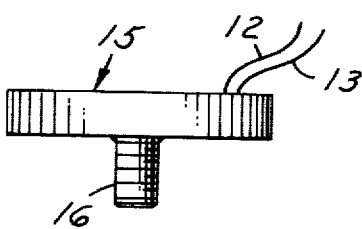
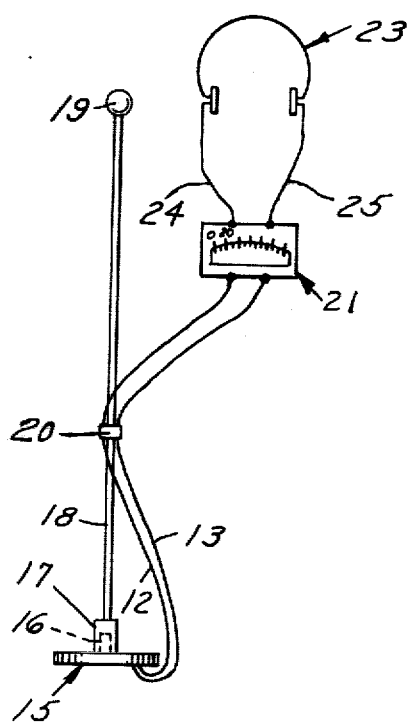

LISTENING DEVICE FOR LOCALIZING UNDERGROUND WATER LEAKAGES

BACKGROUND OF THE INVENTION

1. Field of the Invention

This invention relates to the art of detecting water leaks, and more particularly, to an improved apparatus for localizing underground waer leakages. The invention is specifically concerned with a listening device which is incorporated in a test rod for sensing water leakage noises.

2. Description of the Prior Art

It is well known in the water leakage detection art to employ manual listening boxes and mechanical geophones. It is also known in the prior art to employ electro-acoustic listening devices which employ sensitive microphones. A detailed discussion of the last mentioned prior art water leak detecting apparatuses may be found in U.S. Pat. No. 3,458,656. Other examples of apparatuses for detecting leaks in underground water systems are shown in U.S. Pat. Nos. 1,830,237; 2,755,336; 2,755,880; 2,900,039; 3,223,194, and 3,264,864. It is also known in the water leak detecting art to employ a test rod pick-up of the magnetic variable reluctance type, which employs a diaphragm mounted in a cavity. A magnetic variable reluctance type water leakage detector is available on the market from Health Consultants Incorporated, 100 Tosca Drive, Stoughton, Massachusetts 02072, under the trademark "SON-I-KIT", test rod pick-up. When sound reaches the cavity, the diaphragm vibrates and varies a magnetic field density to induce an alternating current in a pick-up coil which is connected to a suitable amplifier-receiver and heatset. A disadvantage of the last mentioned variable reluctance pick-up testing rod is that it is costly, and it will not withstand high impacts which cause fractures in the apparatus, and it is not waterproof. The magnetic variable reluctance pick-up is also subject to magnetic fields which often create problems in using this type of pick-up.

SUMMARY OF THE INVENTION

In accordance with the present invention, the listening device for pinpointing water leakages includes an elongated rod with a handle on one end for manually positioning of the listening device. An acoustic pick-up apparatus is operatively mounted on the other end of the rod. The acoustic pick-up apparatus comprises a ceramic audio tone transducer which includes a brass diaphragm that is bonded by a conductive bonding agent to a metallized piezo-ceramic wafer. The brass diaphragm and piezo-ceramic wafer are flat and circular in plan view, with the brass diaphragm having a diameter larger than the piezo-ceramic wafer. The brass diaphragm and piezo-ceramic wafer are each operatively connected to separate output lead wires which are connected to a conventional amplifier receiver and head-phone set for visual and audio detection of the water leaks. The output lead wires are interconnected by a resistor. The assembly of the brass diaphragm, and the piezo-ceramic wafer is potted or encased in a waterproof elastomeric material, such as urethane rubber.

The acoustic pick-up apparatus employed in the invention is simple and rugged in construction, and it is immune to magnetic fields which often create problems in using other type pick-up apparatus, such as magnetic variance reluctance pick-up apparatus.

A further advantage of the pick-up apparatus of the present invention is that it may be economically manufactured, and it is waterproof and durable.

BRIEF DESCRIPTION OF THE DRAWINGS

FIG. 1 is a top plan view of the transducer employed in the listening device of the present invention, before potting.

FIG. 2 is a front elevation view of the transducer structure illustrated in FIG. 1.

FIG. 3 is a view similar to FIG. 1 but showing the transducer after potting, and connected to an illustrative amplifier circuit.

FIG. 4 is a front elevation view of the potted transducer illustrated in FIG. 3.

FIG. 5 illustrates the mounting of the transducer on a detachable rod, and showing the transducer operatively connected to an amplifier and headset.

DESCRIPTION OF THE PREFERRED EMBODIMENT

Referring now to the drawings, and in particular to FIGS. 1 and 2, the acoustic pick-up apparatus is generally indicated by the numeral 9 and it comprises a ceramic audio tone transducer. The transducer 9 comprises a circular thin metal disc or diaphragm 10, on one side of which is bonded a piezo-ceramic disc or wafer 11. The piezo-ceramic disc 11 is bonded to the metal disc 10 by any suitable conductive bonding agent.

In one embodiment, the diameter of the metal disc or diaphragm 10 was 1.4 inches and the diameter of the piezo-ceramic wafer or disc was 1.0 inches. The metal disc or diaphragm 10 may be made from any suitable material, as for example, brass. In said embodiment, the thickness of each diaphragm 10 and wafer 11 was each approximately 0.25 mm.

The transducer 9 may be purchased as a unit from various suppliers. One suitable transducer 9 is available on the market from Linden Laboratories, Inc., Box 920, State College, Pennsylvania 16801, under Model No. P/N 70040. Another transducer 9 available on the market and adapted for use in this invention is one available under Model No. 101 from the Piezo Products Division of Gulton Industries, Inc., 300 State College Blvd. Fullerton, California 92631.

As shown in FIGS. 1 and 2, a lead wire 12 is operatively connected to the piezo-ceramic wafer 11, and a lead wire 13 is operatively connected to the metal diaphragm 10. A padding resistor 14 is connected across the lead wires 12 and 13, in parallel with the piezo-ceramic wafer 11 and the metal diaphragm 10. The resistor 14 reduces the output signal for compatibility with the amplifier-receiver used with the transducer 9. Any suitable amplifier receiver may be used, and an amplifier-receiver is generally designated in FIGS. 3 and 5 by the numeral 21.

The assembly of the metal diaphragm 10 and the piezo-ceramic wafer 11 is enclosed or potted in a suitable waterproof elastomeric material, such as urethane rubber, and as indicated by the numeral 15 in FIGS. 3, 4 and 5. A suitable threaded stud 16 is attached to the metal diaphragm 10, on the side opposite to the piezo-ceramic wafer 11, and it is attached by any suitable means, as by brazing.

As shown in FIG. 5, the potted transducer is indicated by the numeral 15, and its attachment stud 16, is threadably mounted in a suitable threaded bore in an attachment sleeve 17. The attachment sleeve 17 is integrally attached by any suitable means, as by welding, to the lower end of a suitable elongated handling rod 18. A ball shaped handle 19 is fixedly mounted on the upper end of the rod 18 for carrying and manipulating the rod 18 and the potted transducer 15.

As shown in FIG. 5, transducer lead wires 12 and 13 are attached to the rod 18 by a suitable retainer clip 20, and they are operatively connected to a conventional amplifier-receiver 21. A suitable head set, generally indicated by the numeral 23, is operatively connected to the amplifier-receiver 21 by suitable lead wires 24 and 25. The circuitry of a suitable amplifier-receiver 21 is illustrated in FIG. 3. The circuitry of FIG. 3 is conventional, and it is illustrative of the type which may be used as a driving circuit for the transducer 9. The circuitry of FIG. 3 includes the capacitors 28, 29 and 36, and the resistors 30, 31, 37 and 38, to establish the operating frequency of the two-wire transducer 9. The supply voltage may be any supply voltage above 5 VDC, with total current requirements ranging from less than 750 microamps to 20 milliamps. A single amplifier, generally indicated by the numeral 33 is required.

In use, the listening device of the present invention is disposed over an underground piping system at various points, as for example, with a potted transducer in contact with the piping system, or over paved areas in alignment with the underground piping system, or over unpaved areas in alignment with the piping system. The potted transducer 15 functions as a receiver for detecting leak noises. A conventional amplifier-receiver 21 detects sounds from leaks and filters out most other frequency noises. The leaks may be seen on the conventional level meter of the amplifier-receiver 21, and they are also heard through the head-set 23.

Experience has shown that the listening device of the present invention is economical to make, light in weight, rugged in construction, simple to operate, and efficient in detecting and pinpointing leaks from the surface of the earth. The resonant frequency of the transducer 9 is approximately 2900 Hertz with a flat response up to approximately 2000 Hertz.

While it will be apparent that the preferred embodiment of the invention herein disclosed is well calculated to achieve the results aforestated, it will be appreciated that the invention is susceptible to modification, variation and change.

What I claim is:

1. A listening device for pinpointing undergound water leakage sounds, and which includes an elongated rod with a handle on one end for manual positioning of the listening device, and which includes an acoustic pick-up means, on the other end of the rod, which is connected to an amplifier-receiver that receives the leakage sounds from the pick-up means and visual leakage signals may be seen on a level meter on the amplifier-receiver, and the leakage sounds may be heard through head-phones connected to the amplifier-receiver, characterized in that:
   (a) the acoustic pick-up means comprises a ceramic audio tone transducer;
   (b) the ceramic audio tone transducer comprises a brass diaphragm which is bonded to a metallized piezo-ceramic wafer by a conductive bonding agent;
   (c) the brass diaphragm and metallized piezo-ceramic wafers are each circular in plan view, with the brass diaphragm having a larger diameter;
   (d) a threaded attachment stud is directly attached to the brass diaphragm for attaching the acoustic pick-up means to said other end of said elongated rod; and,
   (e) the assembly of the brass diaphragm and metallized piezo-ceramic wafer is potted in a waterproof elastomeric material.

2. A listening device as claimed in claim 1, characterized in that:
   the elastomeric waterproof material comprises a urethane rubber.

3. A listening device as claimed in claim 1, characterized in that:
   (a) a first output lead wire has one end connected to the brass diaphragm, and the other end to the amplifier-receiver;
   (b) a second output lead wire has one end connected to the piezo-ceramic wafer and the other end to the amplifier-receiver; and,
   (c) said first and second output lead wires have a resistor connected therebetween in parallel with the brass diaphragm and piezo-ceramic wafer.

* * * * *